US012088043B2

(12) United States Patent
Lin et al.

(10) Patent No.: US 12,088,043 B2
(45) Date of Patent: Sep. 10, 2024

(54) EASY LOCK CONNECTOR WITH UNLOCK STRUCTURE

(71) Applicant: P-TWO INDUSTRIES INC., Taoyuan (TW)

(72) Inventors: Hsien Chang Lin, Taoyuan (TW); Chun Wei Chang, Taoyuan (TW)

(73) Assignee: P-TWO INDUSTRIES INC., Taoyuan (TW)

( * ) Notice: Subject to any disclaimer, the term of this patent is extended or adjusted under 35 U.S.C. 154(b) by 0 days.

(21) Appl. No.: 17/468,980

(22) Filed: Sep. 8, 2021

(65) Prior Publication Data

US 2022/0149565 A1 May 12, 2022

(30) Foreign Application Priority Data

Nov. 9, 2020 (TW) ................................ 109139249

(51) Int. Cl.

*H01R 13/629* (2006.01)
*H01R 12/71* (2011.01)
*H01R 12/77* (2011.01)
*H01R 12/79* (2011.01)
*H01R 13/639* (2006.01)
*H01R 13/6581* (2011.01)
*H01R 13/6598* (2011.01)
*H01R 12/91* (2011.01)

(Continued)

(52) U.S. Cl.

CPC ..... *H01R 13/62955* (2013.01); *H01R 12/716* (2013.01); *H01R 12/774* (2013.01); *H01R 12/79* (2013.01); *H01R 13/639* (2013.01); *H01R 13/6581* (2013.01); *H01R 13/6598* (2013.01); *H01R 12/775* (2013.01); *H01R 12/91* (2013.01); *H01R 13/629* (2013.01); *H01R 13/62933* (2013.01); *H01R 13/648* (2013.01); *H01R 13/658* (2013.01)

(58) Field of Classification Search

CPC ........... H01R 13/62955; H01R 12/716; H01R 12/774; H01R 12/79; H01R 13/639; H01R 13/6581; H01R 13/6598; H01R 12/775; H01R 12/91; H01R 13/629; H01R 13/62933; H01R 13/648; H01R 13/658

See application file for complete search history.

(56) References Cited

U.S. PATENT DOCUMENTS

2013/0078845 A1* 3/2013 Chen ................. H01R 13/6581 439/372

* cited by examiner

*Primary Examiner* — Justin M Kratt
(74) *Attorney, Agent, or Firm* — MUNCY, GEISSLER, OLDS & LOWE, PC

(57) ABSTRACT

The invention provides an easy lock connector with unlock structure applied to a flat wire and a circuit board. The flat wire has a notch and a ground wire on the two sides of a head end respectively. The easy-lock connector includes an upper housing, a lower housing, a rubber core and a terminal. After the notch of the flat wire is buckled by a stopper of the lower housing, by pressing a pressing member of the upper housing, the pressing member applies an external force to an elastic member of the lower housing to deform the elastic member. An extension arm of the lower housing is linked by the elastic member to cause the stopper to act in one direction so as to release the state of the stopper from locking the gap. In another embodiment, the easy-lock connector can also achieve an electromagnetic shielding effect by adding a shielding iron shell.

16 Claims, 12 Drawing Sheets

(51) Int. Cl.

| | |
|---|---|
| *H01R 13/648* | (2006.01) |
| *H01R 13/658* | (2011.01) |

EASY LOCK CONNECTOR WITH UNLOCK STRUCTURE

FIELD OF THE DISCLOSURE

The present invention relates to the technical field of connectors, and more particularly, to an easy lock connector with unlock structure that can automatically lock a flat wire.

BACKGROUND

The conventional connector is provided to connect the wire to the circuit board intermediary connection element, Its advantage is that it can be welded to the circuit board without the need of physical welding, so that users can easily plug and unplug to achieve the effect of electrical connection. In order to ensure the connector and the wire can be firmly in contact, a variety of connection modes have been developed, such as the way of automatic bolt lock, so that the connector and the wire of automatic bolt lock can be easily connected without falling off.

With the problem of high frequency and operational difficulty caused by the miniaturization of connectors, the present invention provides an easy lock connector with unlock structure, which is used to solve the defect caused by the traditional automatic lock connector.

SUMMARY OF THE INVENTION

The first object of the present invention provides an easy-lock connector with unlock structure, comprising: an upper housing, a lower housing, a rubber core and a terminal, with the multi-component structure, in addition to the functions of automatic latching and pressing to unlock, it can also resist noise and smoothly transmit signals in a high-frequency environment.

The second object of the present invention is based on the aforementioned easy-lock connector with unlock structure by the upper housing indirectly driving the lower housing to achieve the purpose of unlocking.

The third object of the present invention is based on the aforementioned easy-lock connector with unlock structure by forming an inclined plane on the rubber core to limit the amount of deformation produced by the pressing member of the upper housing on the elastic member of the lower housing, in order to avoid damage to the elastic member and the pressing member by excessive pressing, the purpose of improving the service life can be achieved.

The fourth object of the present invention is based on the aforementioned easy-lock connector with unlock structure, the shape of the elastic member of the lower housing is a U-shaped body, in addition to providing interference with the pressing member of the upper housing, the operation can also provide a sense of feedback.

The fifth object of the present invention is based on the aforementioned easy-lock connector with unlock structure, the lower housing provides a lower housing grounding piece formed in the second accommodating space for contacting the ground wire of the flat wire, so as to achieve the effect of improving high-frequency crosstalk.

The sixth object of the present invention is based on the aforementioned easy-lock connector with unlock structure, the upper housing has a shielding effect to improve the Electromagnetic Compatibility (EMC) and Electromagnetic Interference (EMI) problems.

The seventh object of the present invention is based on the aforementioned easy-lock connector with unlock structure, further providing a shielding iron shell to cover the connector to improve EMI and EMC problems.

The eighth object of the present invention is based on the aforementioned easy-lock connector with unlock structure, an insert, a buckle and a clip are arranged in the shielding iron shell, the rubber core and the upper housing to provide a floating structure, the welding yield of the connector and the circuit board is improved.

In order to achieve the above objectives and other objectives, the present invention provides an easy-lock connector with unlock structure, is applied to a flat wire and a circuit board, the flat wire respectively comprising a notch and a ground wire on two sides of the head end respectively. The easy-lock connector with unlock structure includes an upper housing, a lower housing, a rubber core and a terminal. The upper housing is arranged on the circuit board, the upper housing forming a first accommodating space, the upper housing having an upper body and a pressing member, the pressing member forming on two sides of the upper body through the notch, wherein the pressing member further includes a first fixing member formed on two sides of the upper body, and the first fixing member is fixed to the circuit board. The lower housing arranging in the first accommodating space, the lower housing forming a second accommodating space, the lower housing having an elastic member, a stopper, an extension arm and a lower body, the elastic member being separately arranged on two sides of the lower body and corresponding to the position of the pressing member, the stopper being arranged according to the notch to buckle the notch, and the stopper connecting to the elastic member through the extension arm. The rubber core arranging in the second accommodating space, the rubber core forms an insertion port, an action portion, and an opening, the insertion port configured to insert and exit the flat wire, the action portion combining the elastic member and the opening for arranging the elastic member, the action portion combining the elastic member and the opening for arranging the elastic member. The terminal arranging on the rubber core, configuring to connect the flat wire with power supply wherein, after the notch of the flat wire is buckled by the stopper, by pressing the pressing member, the pressing member applying an external force to the elastic member to deform the elastic member, and the elastic member linking the extension arm to cause the stopper to act in one direction, to release the state of the stopper from buckling the notch.

Compared with the prior art, the present invention provides the easy-lock connector with unlock structure applied to a flat wire, so that the flat wire can be automatically latched in the accommodating space of the easy-to-lock connector by the multi-piece easy-lock connector, and by applying an external force to the pressing member of the easy-lock connector, the lower housing can be directly driven by the elastic member of the body to be unlocked. In one embodiment, during the unlocking process, the pressing member is restricted by the inclined surface of the rubber core so as not to damage the elastic member or other elements. Furthermore, the easy-lock connector of the present invention provides a variety of electromagnetic shielding or electromagnetic shielding structures, which can effectively prevent external noise from affecting signal transmission or high-frequency signals from affecting signal transmission of other external components. Furthermore, the easy-lock connector of the present invention provides a variety of electromagnetic shielding or electromagnetic shielding structures, which can effectively prevent external noise from affecting signal transmission or high-frequency signals from affecting signal transmission of other external components.

BRIEF DESCRIPTION OF THE DRAWINGS

FIG. 4(*b*) is a side view illustrating the housing of FIG. 1 of the present invention.

DESCRIPTION OF EMBODIMENTS

In order to fully understand the purpose, features, and effects of the present invention, the following specific embodiments are used in conjunction with the accompanying drawings to give a detailed description of the present invention. The description is as follows.

In the present invention, "one" or "one" is used to describe the units, elements, and components described herein. This is just for the convenience of description and provides a general meaning to the scope of the present invention. Therefore, unless it is clearly stated otherwise, this description should be understood to include one or at least one, and the singular number also includes the plural number.

In the present invention, the terms "comprising", "including", "having", "containing" or any other similar terms are intended to cover non-exclusive inclusions. For example, an element, structure, product, or device containing plural elements is not limited to the elements listed herein but may include other elements not explicitly listed but normally inherent to the element, construction, article, or device. In addition, unless there is a clear statement to the contrary, the term "or" refers to the inclusive "or" rather than the exclusive "or".

Figure 1:
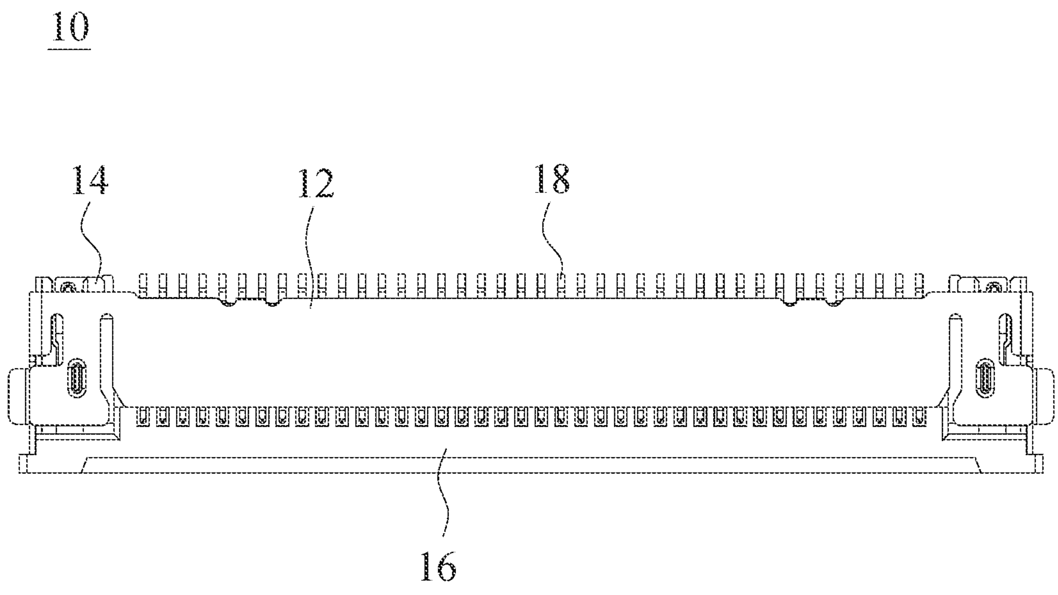
FIG. 1 is a schematic diagram of an easy-lock connector with unlock structure in the first embodiment of the invention.
Figure 2:
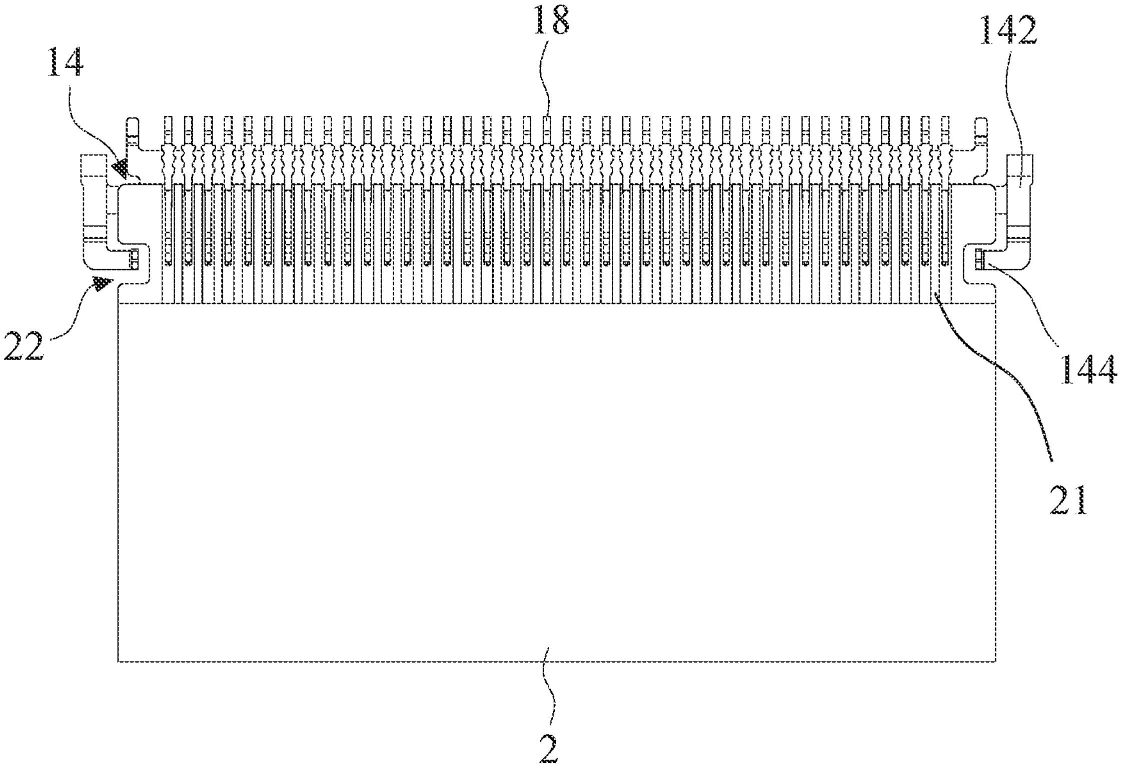
FIG. 2 is a schematic diagram illustrating the connection between the terminal and the lower housing of the present invention.

Please refer to FIG. 1, which is a schematic diagram of an easy-lock connector with unlock structure in the first embodiment of the invention. In FIG. 1, an easy-lock connector with unlock structure 10 (hereinafter referred to as easy-lock connector) is applied to a flat wire 2 (refer to the schematic diagram of FIG. 2) and a circuit board 4 with a ground terminal 42 (refer to Schematic diagram of FIG. 12). In FIG. 2, the flat wire 2 has a notch 22 and a ground wire 21 (formed on the upper and lower surfaces of the flat wire 2) on the two sides of the head end, respectively. Besides, FIG. 2 also shows that the terminal 18 mentioned below is provided on the rubber core 16 to be able to electrically connect the flat wire 2.

Returning to FIG. 1, the easy-lock connector 10 includes an upper housing 12, a lower housing 14, a rubber core 16, and a terminal 18.

Figure 3:
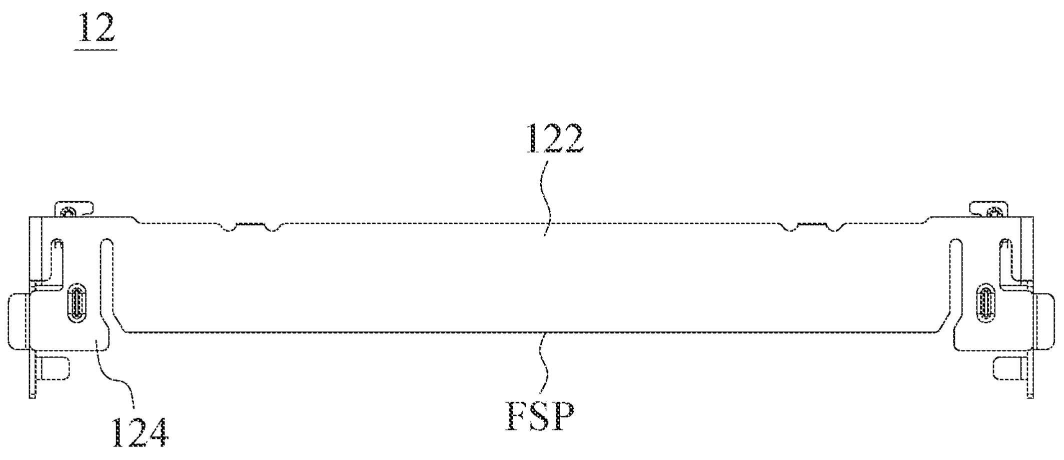
FIG. 3 is a schematic diagram illustrating the housing structure in FIG. 1 of the present invention.

Referring to FIG. 3, it is a schematic diagram illustrating the housing structure in FIG. 1 of the present invention. In FIG. 3, the upper housing 12 can be installed on the circuit board 4 (for example, welding, surface adhesion, etc.). The upper housing 12 forms a first accommodating space FSP. The upper housing 12 has an upper body 122 and a pressing member 124. In this embodiment, the upper housing 12, the upper body 122, and the pressing member 124 are integrally formed, and the material is metal.

Figure 4A:
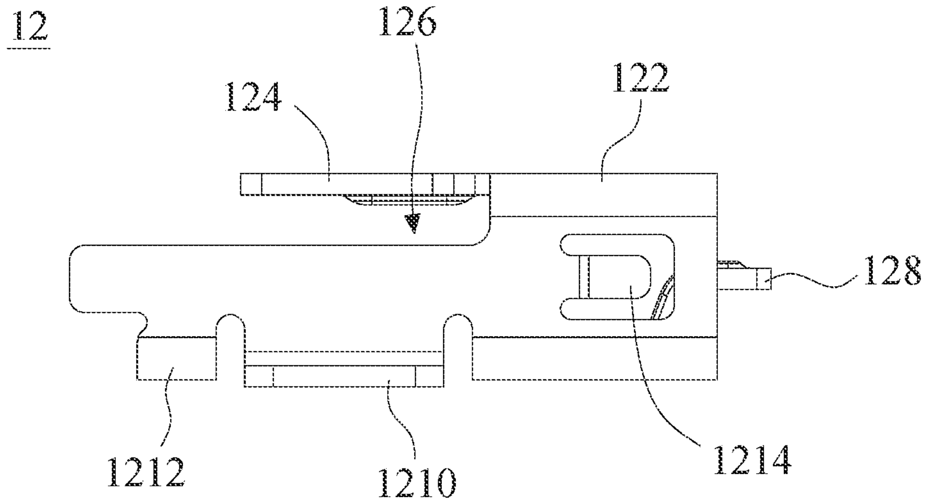
FIG. 4(*a*) is a side view illustrating the housing of FIG. 1 of the present invention.
Figure 4B:
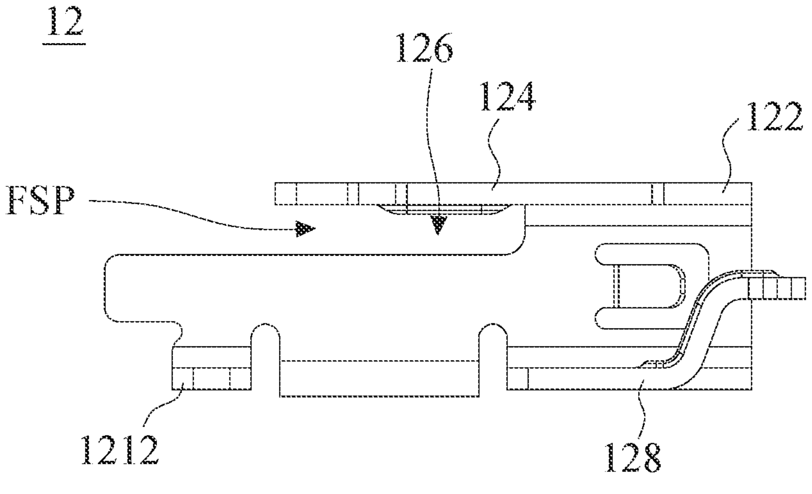

Refer to FIG. 4(*a*) and FIG. 4(*b*), it is a schematic diagram illustrating the side view of the upper housing of FIG. 1 of the present invention. FIGS. 4(*a*) and 4(*b*) to illustrate the side view of the upper casing of FIG. 1 of the present invention. FIG. 4(*a*) is a side view illustrating the outside of the upper housing of FIG. 1 of the present invention and FIG. 4(*b*) is a side view illustrating the inside of the upper housing of FIG. 1 of the present invention. In FIG. 4(*a*), the pressing member 124 is formed on two sides of the upper body 122 through the opening 126. The reason for having the opening 126 is that the pressing member 124 can realize the pressing function. The pressing member 124 further includes a first fixing member 1210. The first fixing member 1210 is formed on two sides of the upper body 122 and the first fixing member 1210 can be fixed to the circuit board 4. The first fixing member 1210 can be welded to the ground terminal 42 of the circuit board 4.

Besides, the upper housing 12 further includes a second fixing member 128 formed in the first accommodating space FSP of the upper housing 12. The second fixing member 128 is disposed at the opening 164 of the rubber core 16 mentioned later (refer to FIG. 8) to limit the rubber core 16 in the first accommodating space FSP.

Besides, the upper housing 12 further includes a grounding member 1212 extending from the first accommodating space FSP of the upper housing 12 to connect to the ground terminal 42 of the circuit board 4 or the ground wire of the flat wire 2.

Besides, the upper housing 12 further includes a first fastener 1214 formed on two sides of the upper body 122 to correspond to the second fastener 166 of the rubber core 16 mentioned later (refer to FIG. 8), by the first fastener 1214 acting on the second fastener 166, the upper shell 12 restricts the rubber core 16 in the first accommodating space FSP. refer to FIG. 9, which shows a side view illustrating the easy-lock connector with unlock structure of the present invention.

Figure 5:
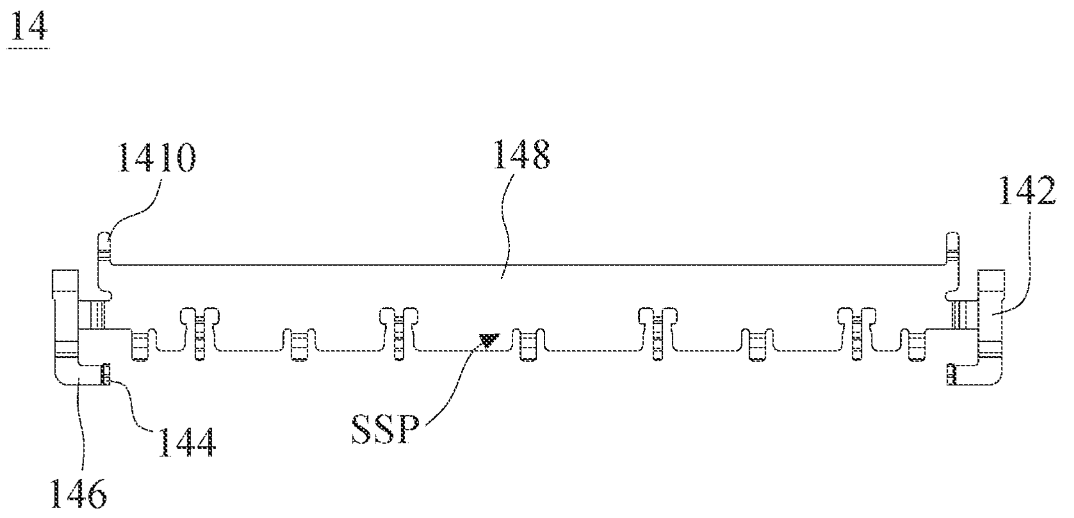
FIG. 5 is a schematic diagram illustrating the structure of the lower housing of FIG. 1 of the present invention.

Referring to FIG. 5, it is a schematic diagram illustrating the structure of the lower housing of FIG. 1 of the present invention. In FIG. 5, the lower housing 14 is arranged in the first accommodating space FSP. The lower housing 14 forms a second accommodating space SSP, which has an elastic member 142, a stopper 144, an extension arm 146, and a lower body 148.

Figure 6:
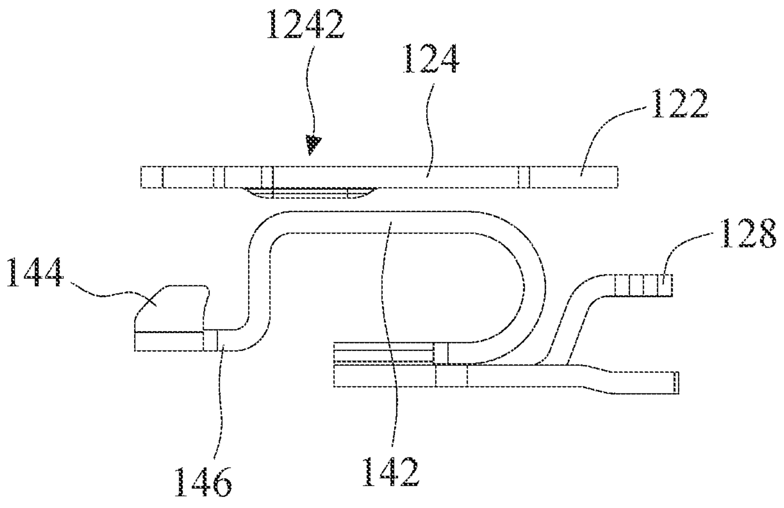
FIG. 6 is a cross-sectional view illustrating the upper housing and the lower housing of the present invention.

Refer to FIG. 6, it is a cross-sectional view illustrating the upper housing and the lower housing of the present invention. The elastic members 142 are separately arranged on two sides of the lower body 148 and corresponding to the positions of the pressing members 124. In the embodiment, the elastic members 142 are U-shaped body, and one end is arranged on the inner wall of the upper housing 12. The stopper 144 is arranged according to the notch 22 to buckle the notch 22, and the stopper 144 is connected to the elastic member 142 through the extension arm 146. In FIG. 6, the upper housing 12 further includes a convex rib 1242, and the convex rib 1242 is arranged corresponding to the elastic member 142. The convex rib 1242 protrudes toward the first accommodating space FSP. The elastic element 142 is not in contact with the pressing member 124 when no external force is applied to the pressing member 124. In other embodiments, the elastic element 142 May be in contact with the compressor 124. In other embodiments, the elastic member 142 and the pressing member 124 may be in contact.

Also, the lower housing 14 may further include a grounding member 1410. The grounding member 1410 extends from the lower housing 14 toward the outside of the second accommodating space to enable the grounding terminal 42 of the circuit board 4.

Figure 11:
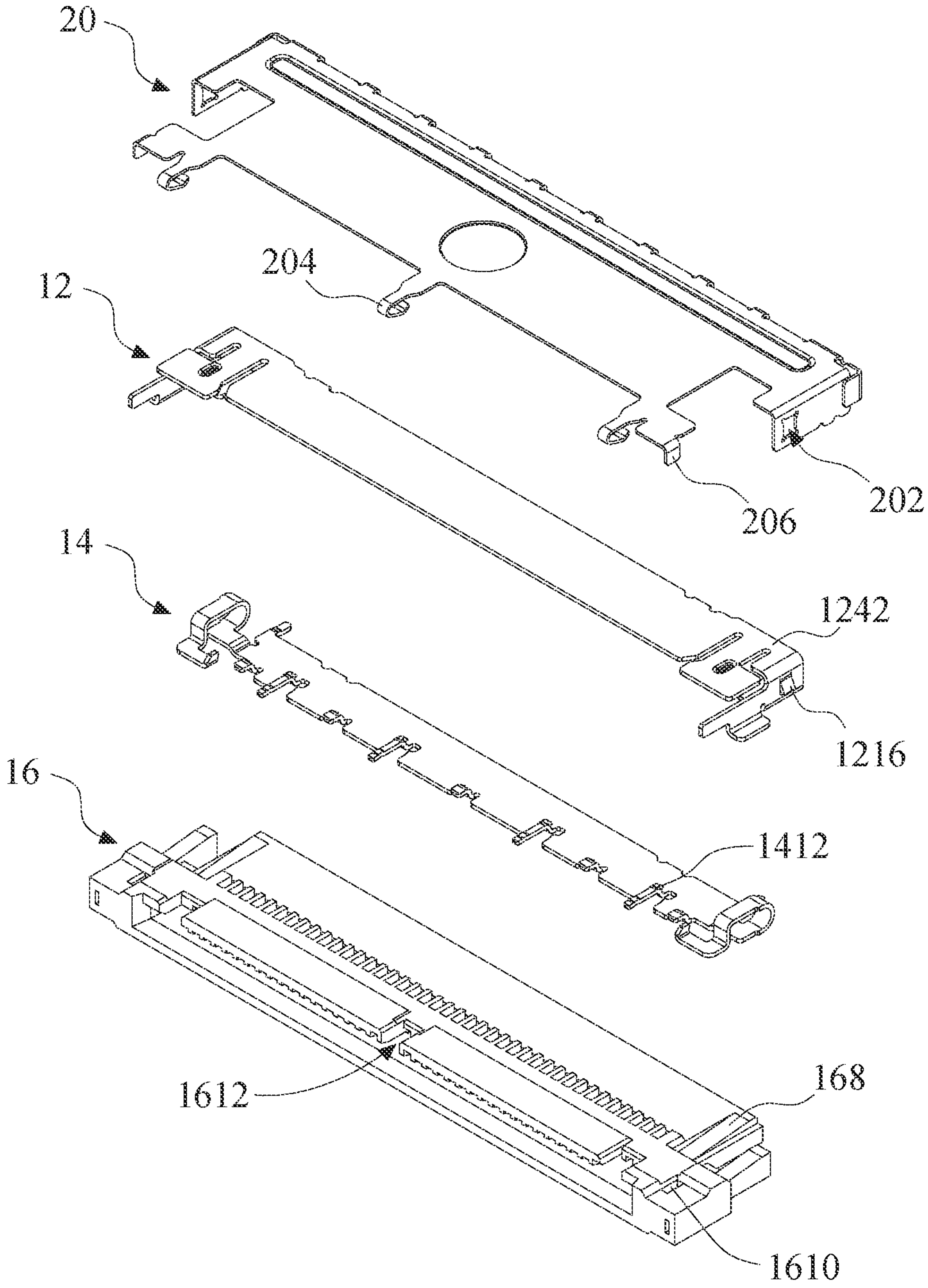
FIG. 11 is a schematic diagram of decomposition of FIG. 10 of the present invention.

Also, the lower housing 14 may further include a second lower housing grounding member 1412 (refer to FIG. 11). The second lower housing grounding member 1412 is formed in the second accommodating space SSP. The second lower housing grounding member 1412 extends from the lower housing 14 toward the second accommodating space SSP to be able to contact the ground wire of the flat wire 2.

Figure 7:
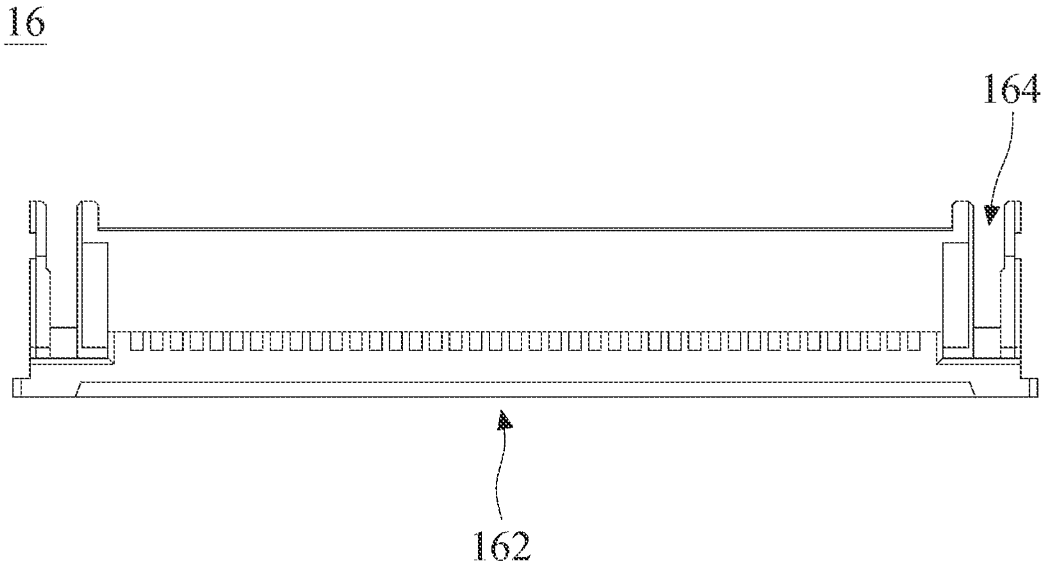
FIG. 7 is a schematic diagram illustrating the structure of the rubber core of FIG. 1 of the present invention.
Figure 8:
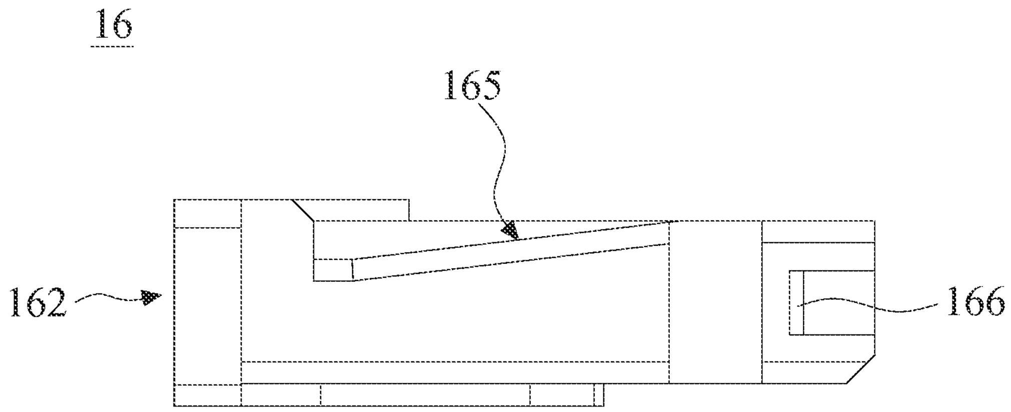
FIG. 8 is a cross-sectional view illustrating the rubber core of FIG. 1 of the present invention.
Figure 9:
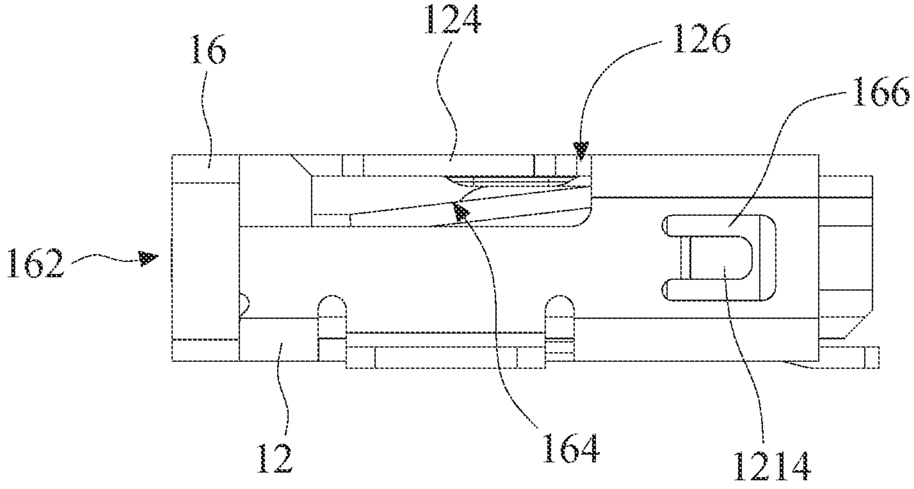
FIG. 9 is a side view illustrating the easy-lock connector with unlock structure of the present invention.

Refer to FIG. 7 and FIG. 8, FIG. 7 is a schematic diagram illustrating the structure of the rubber core of FIG. 1 of the present invention, and FIG. 8 is a cross-sectional view illustrating the rubber core of FIG. 1 of the present invention.

In FIG. 7, the rubber core 16 is arranged in the second accommodating space SSP. The rubber core 16 forms an insertion port 162, an action portion 165, and an opening 164. The insertion port 162 can allow the flat wire 2 to be inserted and exited. The acting portion 165 allows the elastic member 142 to be arranged in the opening 164. In this embodiment, the acting port 165 is a groove, and an inclined surface 168 is formed in the groove (refer to FIG. 11). After the upper housing 12 is combined with the rubber core 16, refer to FIG. 9, when an external force is applied to the pressing member 124 of the upper housing 12, the pressing member 124 will sink into the groove until the pressing member 124 completely touches the inclined surface 168, that is, the pressing member 124 is attached to the inclined surface 168. The pressing depth of the pressing member 124 can be determined by restricting the movement of the pressing member 124 by the inclined surface 168.

Therefore, when the flat wire 2 leads into the insertion port 162, the notch 22 touches the stopper 144 to cause the extension arm 146 and the elastic member 142 to be deformed, and the stopper 144 is finally buckled into the notch 22. After the notch 22 of the flat wire 2 is buckled by the stopper 144, by pressing the pressing member 124, the pressing member 124 applies an external force on the elastic member 142 to generate deformation on the elastic member 142, and the amount of deformation of the elastic member 142 corresponds to the slope of the inclined surface 168. Then the elastic member 142 links the extension arm 146 to cause the stopper 144 to act in one direction, to release the state of the stopper 144 buckling on the notch 22, thereby achieving the purpose of unlocking.

Figure 10:
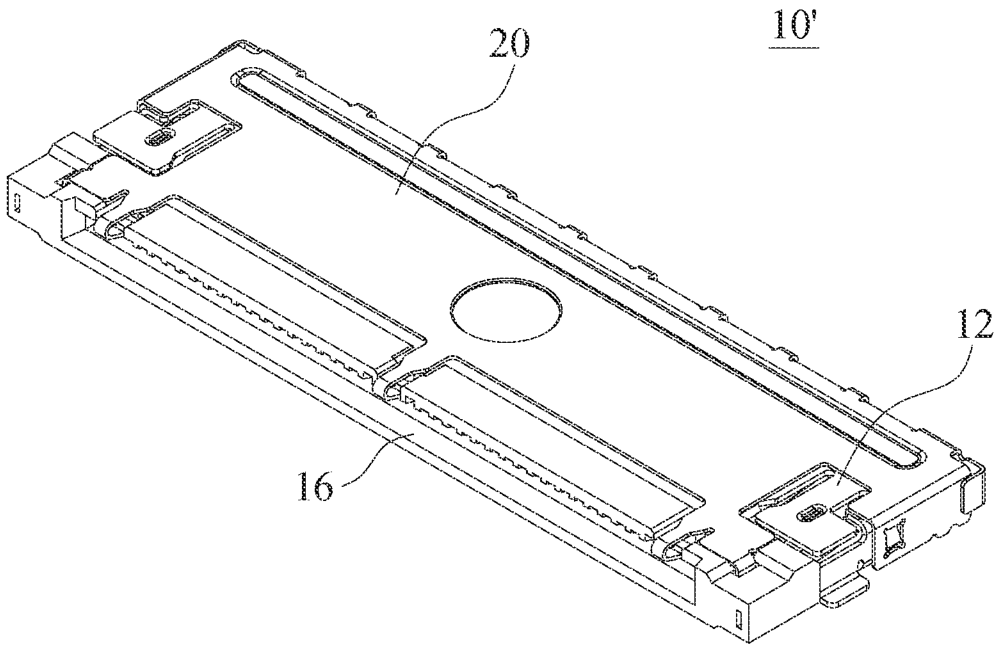
FIG. 10 is a structural diagram of an easy-lock connector with unlock structure according to a second embodiment of the present invention.

Please refer to FIG. 10, which is a structural diagram of an easy-lock connector with unlock structure according to a second embodiment of the present invention. In FIG. 10, the easy-lock connector with unlocking structure 10' not only includes the upper housing 12, the lower housing 14, the rubber core 16, and the terminal 18 of the first embodiment but also includes a shielding iron shell 20.

The descriptions of the upper housing 12, the lower housing 14, the rubber core 16, and the terminals 18 are as described above, and will not be repeated here.

The shielding iron shell 20 is arranged on the upper shell 12, and its structure can be described with reference to FIG. 11. FIG. 11 is a schematic diagram of the decomposition of FIG. 10 of the present invention. In FIG. 11, the shielding iron shell 20 further includes a first external fastener 202, a first iron shell grounding 204 and an insert 206. The first external fastener 202 is formed on two sides of the shielding iron shell 20, and the first iron shell grounding 204, and the insert 206 are disposed of adjacent to the insertion port 162 of the rubber core 16. The first iron shell grounding 204 is a ground wire capable of contacting the flat wire 2.

Besides, the upper housing 12 further includes a second external fastener 1216 and the rubber core 16 further includes a jack 1610 and a ground opening 1612. The second external fastener 1216 is provided corresponding to the first external fastener 202. The jack 1610 is provided corresponding to the insert 206 and the ground opening 1612 is provided corresponding to the first iron shell grounding 204. Through the insert 206, the first external fastener 202, the second external fastener 1216, and the jack 1610, the shielding iron shell 20 is covered on the upper housing 12, and the rubber core 16.

Figure 12:
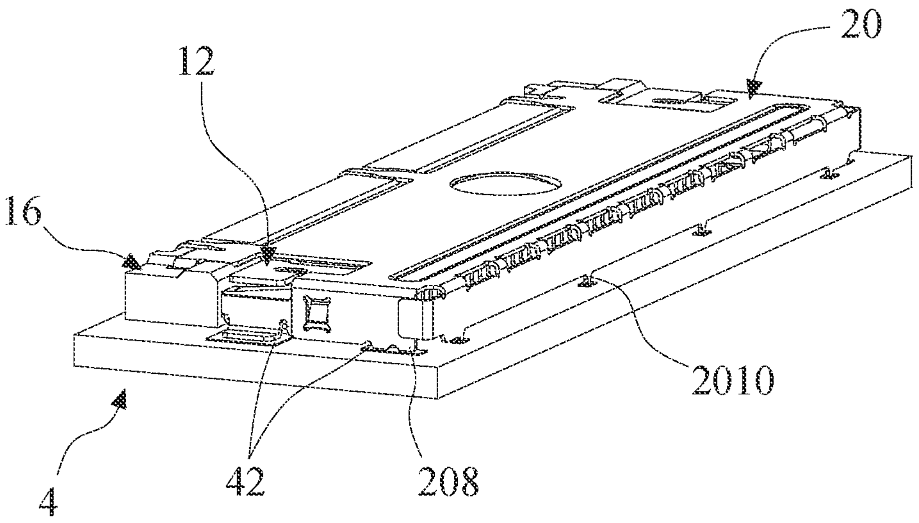
FIG. 12 is a schematic diagram illustrating the connection between the easy-lock connector with the unlock structure and the circuit board of the present invention.

Referring to FIG. 12, it is a schematic diagram illustrating the connection between the easy-lock connector with the unlock structure and the circuit board of the present invention. In FIG. 12, in addition to the upper housing 12, the lower housing 14, the rubber core 16, the terminal 18, and the shielding iron shell 20, the shielding iron shell 20 further includes a second shell grounding 208 and a third shell grounding 2010. The second shell grounding 208 and the third shell grounding 2010 are formed on the side edges of the shielding iron shell 20, and the second shell grounding 208 and the third shell grounding 2010 can contact the ground terminal 42 of the circuit board 4. It is worth noting that the aforementioned structure of the insert 206, the first external fastener 202, the second external fastener 1216 and the jack 1610 can produce, for example, a floating effect in the up and down direction, that is, through the design of first external fastener 202 and the second external fastener 1216, for example, provides a movable space. For example, the first external fastener 202 is an opening and the second external fastener 1216 is a convex block. When the opening is larger than the convex block, the convex block can be moving in the opening allows the second shell grounding 208 and the third shell grounding 2010 of the shielding iron shell 20 to adjust their positions along with the surface of the circuit board 4 so that they can be welded to the circuit board 4 smoothly.

The present invention has been disclosed in the preferred embodiment above. However, it can be appreciated by one of ordinary skill in the art that these embodiments are illustrative rather than limitations of the scope of the present invention. It should be noted that the above embodiments can be modified and replaced with equivalents thereof without departing from the scope of the present invention. Therefore, the scope claimed of the present invention should only be defined by the following claims.

What is claimed is:

1. An easy-lock connector with unlock structure, for receiving a flat wire and being arranged on a circuit board, the flat wire comprising a head end, notches and ground wires, the head end having a first side and a second side opposite from the first side, the notches and ground wires being provided on each of the first and second sides of the head end, the easy-lock connector with unlock structure comprising:

an upper housing arranged on the circuit board, the upper housing forming a first accommodating space, the upper housing having an upper body and a pressing member, the pressing member forming on two sides of the upper body through the notch;

a lower housing arranged in the first accommodating space, the lower housing forming a second accommodating space, the lower housing having an elastic member, a stopper, an extension arm and a lower body, the elastic member being separately arranged on two sides of the lower body and corresponding to the position of the pressing member, the stopper being arranged according to the notch to buckle the notch, and the stopper connecting to the elastic member through the extension arm;

a rubber core arranged in the second accommodating space, the rubber core forms an insertion port, an action portion, and an opening, the insertion port configured for insertion and removal of the flat wire, the action portion allowing the elastic member to be arranged in the opening; and a terminal arranged on the rubber core, configuring to connect the flat wire with a power supply;

wherein after the notch of the flat wire is buckled by the stopper, by pressing the pressing member, the pressing member applies an external force to the elastic member to deform the elastic member, and the elastic member links the extension arm to cause the stopper to act in one direction, to release the state of the stopper from buckling the notch.

2. The easy-lock connector with unlock structure according to claim 1, wherein the action port comprises an inclined plane, after the pressing member acts on the inclined plane, the pressing member is limited to the inclined plane, so that the amount of deformation of the elastic member corresponds to the slope of the inclined plane.

3. The easy-lock connector with unlock structure according to claim 1, wherein the upper housing further includes a first fixing member formed on two sides of the upper body, and the first fixing member is fixed to the circuit board, or, the lower housing further includes the first fixing member, the first fixing member is formed on two sides of the lower body, and the first fixing member is fixed to the circuit board.

4. The easy-lock connector with unlock structure according to claim 1, wherein the elastic member is not in contact with the pressing member when the external force is not applied.

5. The easy-lock connector with unlock structure according to claim 1, wherein the upper housing further includes a convex rib, the convex rib is arranged corresponding to the elastic member, and the convex rib protrudes toward the first accommodating space.

6. The easy-lock connector with unlock structure according to claim 1, wherein the upper housing further includes a second fixing member formed in the first accommodating space of the upper housing, and the second fixing member is disposed at the opening of the rubber core to limit the rubber core in the first accommodating space.

7. The easy-lock connector with unlock structure according to claim 1, wherein the elastic member is a U-shaped body, one end of the elastic member is arranged on the inner wall of the upper housing.

8. The easy-lock connector with unlock structure according to claim 1, wherein the lower housing further includes a lower housing grounding member formed in the second accommodating space, and the lower housing grounding member is raised from the lower housing toward the second accommodating space to contact the ground wire of the flat wire.

9. The easy-lock connector with unlock structure according to claim 2, wherein the acting portion of the rubber core is a groove, and the inclined plane is formed in the groove.

10. The easy-lock connector with unlock structure according to claim 9, wherein the inclined surface is formed on one or both sides of the opening to correspond to the pressing member.

11. The easy-lock connector with unlock structure according to claim 1, wherein the upper housing further includes a first fastener and the rubber core further includes a second fastener, the first fastener is formed on two sides of the upper body and the second fastener is formed on two sides of the rubber core, the first fastener is arranged corresponding to the second fastener, by the first fastener acting on the second fastener the upper housing restricts the rubber core at the first housing space.

12. The easy-lock connector with unlock structure according to claim 1, further comprising a shielding iron shell, and the shielding iron shell is arranged on the upper housing.

13. The easy-lock connector with unlock structure according to claim 12, wherein the shielding iron shell further comprises a first external fastener, an insert, and a first iron shell grounding, the first external fastener is formed on two sides of the shielding iron shell, the first iron shell grounding and the insert are arranged adjacent to the insertion port of the rubber core, and the first iron shell grounding is for contacting the ground wire of the flat wire.

14. The easy-lock connector with unlock structure according to claim 12, wherein the shielding iron shell further comprising a second shell grounding and a third shell grounding, the second shell grounding and the third shell grounding are formed on the side edge of the shielding iron shell, the second shell grounding and the third shell grounding are for contacting the ground terminal of the circuit board.

15. The easy-lock connector with unlock structure according to claim 13, wherein the upper housing further comprises a second external fastener and the rubber core further comprises a jack and ground opening, the second external fastener arranged corresponding to the first external fastener, the jack arranged corresponding to the insert, the ground opening arranged corresponding to the first iron shell grounding, with the insert, the first external fastener, the second external fastener and the jack, the shielding iron shell covering the upper housing and the rubber core.

16. The easy-lock connector with unlock structure according to claim 15, wherein the shielding iron shell, rubber core and the upper housing provide a floating connection by buckling the first external fastener and the second first external fastener into the jack.

* * * * *